United States Patent Office 3,546,257
Patented Dec. 8, 1970

---

3,546,257
OXIDATION OF ALIPHATIC DIENES TO
PRODUCE FURALDEHYDES
Theodor Vrbaski, Harvey, Ill., and Thomas David Sheehan, Kalamazoo, Mich., assignors to Sinclair Research, Inc., New York, N.Y., a corporation of Delaware
No Drawing. Filed Mar. 25, 1968, Ser. No. 715,492
Int. Cl. C07d 5/22, 5/14
U.S. Cl. 260—347.8                     13 Claims

ABSTRACT OF THE DISCLOSURE

A process for the catalytic, vapor phase oxidation of a 1,3-diene selected from the group consisting of 1,3-pentadiene and 2-methyl-1,3-butadiene to produce a furaldehyde which comprises oxidizing said 1,3-diene in the vapor phase at a temperature of about 350 to 550° C. with molecular oxygen-containing gas in the presence of an oxidation catalyst containing oxides of copper, arsenic, tellurium, and molybdenum. The metals are present in the catalyst in the following atomic ratios:

$$Cu_aAs_bTe_cMo_d$$

wherein $a$ is about 2 to 20, $b$ is about 0.1 to 15, $c$ is about 0.1 to 5, and $d$ is about 20 to 30.

---

This invention relates to the vapor phase oxidation of aliphatic dienes and more particularly relates to the vapor phase oxidation of 1,3-pentadiene and 2-methyl-1,3-butadiene (isoprene) in the presence of a catalyst comprising oxides of tellurium, arsenic, copper and molybdenum to produce 2-furaldehyde (furfural) and 3-furaldehyde, respectively.

2-furaldehyde (furfural) is presently obtained in commercial quantities by hydrolysis of corn cobs and similar materials in concentrated mineral acids. The preparation of 3-furaldehyde, however, is tedious and involves several steps. The method includes the preparation of the mercury salt of 2-furancarboxylic acid from pyromucic acid; pyrolysis of the mercury salt of 2-furancarboxylic acid; reaction of the resulting chloromercuryfuran with iodine; the halogen-metal interconversion of 3-iodofuran with butyllithium to prepare 3-furyllithium; and the hydrolysis of 3-furyllithium with dimethylformamid to produce 3-furaldehyde. The ultimate yield of 3-furaldehyde is less than 5 percent based on the weight of the starting pyromucic acid used.

The process of the present invention is a novel, vapor phase, catalytic oxidation of 1,3-pentadiene and 2-methyl-1,3-butadiene (isoprene) to produce 2-furaldehyde and 3-furaldehyde, respectively, which avoids most of the problems associated with prior art processes. In accordance with the present invention, 2-furaldehyde (furfural) can be prepared by conducting vapor phase oxidation of 1,3-pentadiene in the presence of molecular oxygen-containing gas, e.g. air, and an oxidation catalyst. Similarly, 3-furaldehyde can be prepared by conducting vapor phase oxidation of 2-methyl-1,3-butadiene (isoprene) in the presence of molecular oxygen-containing gas, e.g. air, and the catalyst. The catalyst used in the method of this invention may conveniently be represented by the following empirical formula:

$$Cu_aAs_bTe_cMo_dO_e$$

where $a$ is about 2 to 20, $b$ is about 0.1 to 15, $c$ is about 0.1 to 5, $d$ is about 20 to 30 and $e$ designates that the metals are present as oxides and can preferably be, for instance, about 36 to 76 when the other elements are in their fully oxidated state. The amount of oxygen can be reduced correspondingly when the elements are in the lower valence state. A preferred catalyst is one in which $a$ is in the range from about 6 to 10, $b$ in the range from about 2 to 6, $c$ in the range from about 0.5 to 2 and $d$ in the range from about 22 to 28 and the best value for $d$ seems to be about 25. The catalyst can be carried on solid supports or be unsupported. Useful supports include, for example, silica, alpha-alumina (e.g., corundum), silicon carbide, graphite and the like, preferably having a surface area of up to about 50 square meters per gram.

The catalyst can readily be prepared by methods known to those skilled in the art. The catalyst can be prepared for instance, by intimately mixing the oxides of molybdenum, copper, tellurium and arsenic, or compounds giving oxides on heating, for example, nitrates, hydroxides or basic nitrates. Alternatively, the catalyst can be prepared by precipitation, e.g., by adding an aqueous solution of copper nitrate to an aqueous solution or suspension of suitable salts of the other metals, neutralizing the mixture with ammonia and recovering the precipitate. The resulting cake is dried between 150 and 300° C. for four hours and then broken into granules or pelletized into tablets of desired size. The activity of the catalyst is improved by a prior heat treatment or calcination, for instance at a temperature between about 500 and 1100° C. say for 2 hours. If a supported catalyst is prepared, the catalytic metal oxides may be deposited on the support from an aqueous slurry of the metal oxides or oxides and nitrates, or the support may be impregnated with the metal salts in solution and then dried followed by heat treatment in a manner similar to that described in the preparation of unsupported catalyst.

The operating conditions which give favorable yields for the vapor phase oxidation of the aliphatic diene feedstock may vary widely. The oxidation is generally conducted at atmospheric pressure, or elevated pressure if desired, and elevated temperatures. A suitable oxidation temperature, for example, is within the range of about 350 to 550° C., preferably about 450 to 525° C. The weight hourly space velocity is generally about 0.01 to 0.50 hr.$^{-1}$, preferably about 0.03 to 0.15 hr.$^{-1}$, with the volumetric hourly space velocity being about 100 to 5000 hr.$^{-1}$, preferably about 300 to 1500 hr.$^{-1}$. The maintenance of the space velocity within these ranges is advantageous in the production of the desired furaldehyde and the avoidance of the excessive production of by-products. The volumetric hourly space velocity is expressed with respect to the void volume which in the examples is 0.667 milliliter per one milliliter of catalyst bed. In carrying out the oxidation, it is preferable to use a gas mixture containing about 5 to 10 mole percent aliphatic diene, about 10 to 40 mole percent oxygen, and about 50 to 85 mole percent nitrogen or other inert gas and to preheat the mixture to within a few degrees of the reactor temperature before introduction into the reaction zone, for example, to a temperature of about 450 to 525° C. A portion of the nitrogen can be replaced with steam so that, for instance, the gas mixture contains about 40 to 45 mole percent $H_2O$.

The following examples will further illustrate the present invention.

EXAMPLE I

The catalyst was prepared in the following manner. About 8 molar nitric acid was prepared by adding 50 ml. of concentrated nitric acid to 50 ml. of water. The nitric acid was warmed and stirred and, while warming and stirring the nitric acid, the following sequential additions were made: 0.75 gm. $As_2O_3$, 0.35 gm. $TeO_2$, 2.49 gm. $MoO_3$ and 3.15 gm. $(Cu(NO_3)_2 \cdot 3H_2O$. After about 20 minutes, a small portion of solid phase was present. The chemicals were poured onto 80 gm. of warmed, 8–10 mesh, porous silicon carbide (< one square meters per gram surface area) and the mixture was heated and stirred until all the nitric acid was evaporated. With continued heating and stirring, 50 ml. of concentrated ammonium hydroxide (0.9 sp. gr.) was slowly added. Heating and stirring were continued until all liquid was evaporated. The remaining solid was then heated to about 260° C. to sublime the ammonium nitrate from the catalyst and was followed by heat treatment at 500° C. for two hours in the presence of air. The prepared catalyst contained 5.3 wt. percent of active material on the silicon carbide support. The surface area was Zero sq. m. per gm. The atomic ratio of molybdenum:copper:arsenic:tellurium in the catalyst was 25:8:4:1.

EXAMPLE II

An all-glass flow apparatus was used which comprised a flow-metering section, evaporator, gas carburetor, reactor and product-collecting section. The gas input flow ratios of prepurified nitrogen and oxygen were measured by three capillary flow meters. The addition of the organic feed to the system was performed by saturation of the primary nitrogen stream with the diene vapors in the evaporator at a fixed temperature. The addition of water was performed by saturation of the oxygen stream with water vapor in the evaporator at a fixed temperature. Secondary nitrogen was introduced and the mixture (oxygen plus water, primary nitrogen plus diene, and secondary nitrogen) was mixed in the gas carburetor and then passed to the reatcor which comprised a preheating section and a reaction chamber (51.8 ml.) of a tubular design having an I.D. of 6.0 mm. The reactor was immersed in an electrically heated and stirred bath of a low-melting heat-treating salt. The temperature was controlled to ±0.5° C.

The reactor was packed with about 48.8 gm. of the catalyst prepared in Example I. The catalyst was mechanically stable and resisted disintegration during use in the reactor.

Effluent gases from the reatcor were passed through a glass air-condenser, two Dry-Ice traps, a water scrubber and were finally metered through a wet-test meter. Determinations of carbon oxides in the gas were carried out by gas chromatography. The condensed products were analyzed by conventional methods such as mass spectrometry, liquid gas chromatography and volumetry. The yield is defined as the number of grams of product formed per one hundred grams of hydrocarbon feed. The selectivity is defined as the number of grams of product formed per one hundred grams of feed reacted.

In the apparatus described above, a gas mixture containing 7.3 volume percent 1,3-pentadiene, 20.9 volume percent oxygen, 28.8 volume percent nitrogen and 43 volume percent steam was oxidized at a volume hourly space velocity of 500 hr.$^{-1}$ and a temperature of 485° C. using the catalyst described above. The yield of 2-furaldehyde (furfural) was 15.0 wt. percent and the selectivity was 26.5 wt. percent. The by-products comprised 2-methylfuran, alpha-pyrone, furan, formaldehyde and carbon oxides.

EXAMPLE III

In the apparatus described in Example II, a gas mixture containing 7.8 volume percent 2-methyl-1,3-butadiene (isoprene), 10.4 volume percent oxygen, and 81.8 volume percent nitrogen was oxidized at a volume hourly space velocity of 500 hr.$^{-1}$ and a temperature of 485° C. using the catalyst prepared in Example I. The yield of 3-furaldehyde was 13.0 wt. percent and the selectivity was 20.9 wt. percent. The by-products comprised 3-methylfuran, furan, formaldehyde and carbon oxides.

It is claimed:

1. A process for the catalytic vapor phase oxidation of a 1,3-diene selected from the group consisting of 1,3-pentadiene and 2-methyl-1,3-butadiene to produce a furaldehyde which comprises oxidizing said 1,3-diene in the vapor phase at a temperature of about 350 to 550° C. with molecular oxygen-containing gas in the presence of an oxidation catalyst consisting essentially of oxides of copper, arsenic, tellurium, and molybdenum, said metals being present in the catalyst in the following atomic ratios:

$$Cu_aAs_bTe_cMo_d$$

wherein $a$ is about 2 to 20, $b$ is about 0.1 to 15, $c$ is about 0.1 to 5, and $d$ is about 20 to 30.

2. A process for the catalytic vapor phase oxidation of 1,3-pentadiene to produce 2-furaldehyde which comprises oxidizing said 1,3-pentadiene in the vapor phase at a temperature of about 350 to 550° C. with molecular oxygen-containing gas in the presence of an oxidation catalyst consisting essentially of oxides of copper, arsenic, tellurium, and molybdenum, said metals being present in the catalyst in the following atomic ratios:

$$Cu_aAs_bTe_cMo_d$$

wherein $a$ is about 2 to 20, $b$ is about 0.1 to 15, $c$ is about 0.1 to 5, and $d$ is about 20 to 30.

3. The process of claim 2 wherein the catalyst is supported on a carrier material having a surface area of up to about 50 sq. meters per gm.

4. The process of claim 3 wherein the carrier material is silicon carbide.

5. The process of claim 2 wherein the oxidation reaction is conducted at a temperature of about 450 to 525° C. and a volumetric hourly space velocity of about 300 to 1500 hr.$^{-1}$.

6. The process of claim 5 wherein the oxidation catalyst consists essentially of oxides of copper, arsenic, tellurium, and molybdenum, said metals being present in the catalyst in the following atomic ratios:

$$Cu_aAs_bTe_cMo_d$$

wherein $a$ is about 6 to 10, $b$ is about 2 to 6, $c$ is about 0.5 to 2, and $d$ is about 22 to 28.

7. The process of claim 6 wherein the oxidation is conducted in the presence of a mixture of nitrogen and steam.

8. A process for the catalytic vapor phase oxidation of 2-methyl-1,3-butadiene to produce 3-furaldehyde which comprises oxidizing said 2-methyl-1,3-butadiene in the vapor phase at a temperature of about 350 to 550° C. with molecular oxygen-containing gas in the presence of an oxidation catalyst consisting essentially of oxides of copper, arsenic, tellurium, and molybdenum, said metals being present in the catalyst in the following atomic ratios:

$$Cu_aAs_bTe_cMo_d$$

wherein $a$ is about 2 to 20, $b$ is about 0.1 to 15, $c$ is about 0.1 to 5, and $d$ is about 20 to 30.

9. The process of claim 8 wherein the catalyst is supported on a carrier material having a surface area of up to about 50 sq. meters per gm.

10. The process of claim 9 wherein the carrier material is silicon carbide.

11. The process of claim 8 wherein the oxidation reaction is conducted at a temperature of about 450 to 525° C. and a volumetric hourly space velocity of about 300 to 1500 hr.$^{-1}$.

12. The process of claim 11 wherein the oxidation catalyst consists essentially of oxides of copper, arsenic, tellurium, and molybdenum, said metals being present in the catalyst in the following atomic ratios:

$$Cu_aAs_bTe_cMo_d$$

wherein $a$ is about 6 to 10, $b$ is about 2 to 6, $c$ is about 0.5 to 2, and $d$ is about 22 to 28.

13. The process of claim 12 wherein the oxidation is conducted in the presence of nitrogen.

References Cited

Gronowitz et al., Chem. Abstracts, (1963) vol. 58, p. 5605e.

ALEX MAZEL, Primary Examiner
B. I. DENTZ, Assistant Examiner

U.S. Cl. X.R.

260—347.9